United States Patent
Kouchi et al.

(10) Patent No.: US 7,440,693 B2
(45) Date of Patent: Oct. 21, 2008

(54) CAMERA DEVICE

(75) Inventors: Takamitsu Kouchi, Kadoma (JP);
Kazumi Teratani, Hirakata (JP);
Hirofumi Takemasa, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 234 days.

(21) Appl. No.: 11/269,532

(22) Filed: Nov. 9, 2005

(65) Prior Publication Data

US 2006/0098974 A1 May 11, 2006

(30) Foreign Application Priority Data

Nov. 11, 2004 (JP) ............................. 2004-327418

(51) Int. Cl.
*G03B 17/48* (2006.01)
*G03B 11/04* (2006.01)

(52) U.S. Cl. ........................ 396/431; 396/534; 396/535; 348/333.03

(58) Field of Classification Search ................. 396/431, 396/25–29, 376, 378, 427, 429, 439, 534, 396/535; 348/207.99, 333.03, 143, 151, 348/373, 371, 375

See application file for complete search history.

(56) References Cited

U.S. PATENT DOCUMENTS

| 4,159,170 | A | | 6/1979 | Kuramoto et al. ........... 396/544 |
| 5,650,817 | A | * | 7/1997 | Jae-chon ................... 348/240.3 |
| 6,178,297 | B1 | * | 1/2001 | Ting ........................... 396/431 |
| 6,788,887 | B2 | | 9/2004 | Takeshita et al. ............... 396/6 |
| 2005/0146641 | A1 | * | 7/2005 | Cheng ......................... 348/373 |

FOREIGN PATENT DOCUMENTS

JP 05-158126 6/1993

* cited by examiner

*Primary Examiner*—Rochelle-Ann J Blackman
(74) *Attorney, Agent, or Firm*—Steptoe & Johnson LLP

(57) ABSTRACT

In order to grasp an image capturing range, an image monitor is used for recognizing the range. A camera device of the present invention has a configuration that, depending on the shape and position of a shield unit that limits a range where a display lamp is visible, the range where the display lamp is visible is limited, and by making the range where the display lamp is visible and the angle of view of the camera coincident with each other, a subject can recognize to be within the image capturing angle of view during an image capturing process when the subject is in a range where the display lamp is visible and, also, can recognize to be out of the image capturing angle of view when the subject is located at a position where the display lamp is invisible.

10 Claims, 4 Drawing Sheets

CAMERA DEVICE

BACKGROUND OF THE INVENTION

1. Field of the Invention

The present invention relates to a camera device used for capturing images.

2. Description of the Related Art

In recent years, camera devices, such as monitoring cameras and security cameras, have been used increasingly. In these camera devices, some of them are of a type which can automatically change the camera angle by detecting a subject; however, even at present, those camera devices of a fixed type have been generally used.

Normally, as to whether or not a camera device is in operation, a person as a subject is allowed to know the operating state thereof by recognizing whether or not a display lamp attached to the camera is glowing or by determining the color and the like of the lamp (for example, see JP5-252426 A).

In this case, however, since the angle of view in which the fixed-type camera device can capture images is limited, a problem arises in the conventional structure in which it is not possible to grasp to which range the image is covering, without confirming the image captured by the camera device by using an image monitor or the like. Moreover, in particular, in the case where, for example, an image of a subject is captured by a fixed-type camera device placed in a squad car, there is sometimes no time margin required for confirming whether or not images are being captured through an image monitor or the like. In other words, the problem is that it is impossible for the subject to recognize whether or not the subject is covered by the viewing field of the camera device, that is, whether or not the subject is located within the angle of view.

SUMMARY OF THE INVENTION

In order to solve the above-mentioned problems, an object of the present invention is to provide a camera device which allows recognition as to whether or not a subject is located within an angle of view during an image capturing process.

In order to achieve the above-mentioned object, the camera device according to the present invention has a structure that a range where a display lamp serving as a display unit is visible is limited depending on the shape and position of a shield unit that limits the range where the display lamp is visible, and by making the range where the display lamp is visible coincident with the angle of view of the camera, the subject can recognize to be in the image capturing angle of view when the subject is within a range where the display lamp is visible and, also, can recognize to be out of the image capturing angle of view when the subject is located at a position where the display lamp is invisible.

According to the camera device of the present invention, when the subject is in the range where the display lamp is visible, the subject can recognize to be in the image capturing angle of view. In contrast, when the subject is located at a position where the display lamp is invisible, the subject can immediately recognize to be out of the image capturing angle of view; therefore, this arrangement allows the subject to recognize whether or not the subject is located within the angle of view during an image capturing process.

DESCRIPTION OF THE PREFERRED EMBODIMENTS

Figure 1:
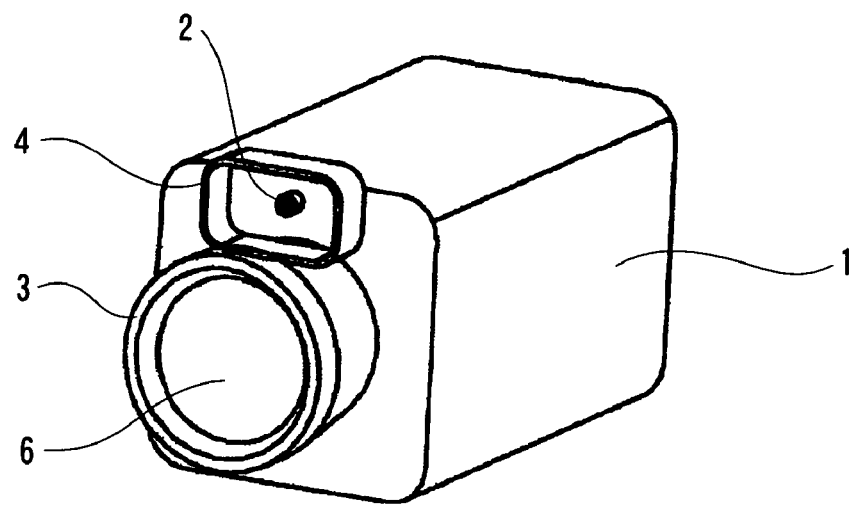
FIG. 1 is a perspective view that shows a camera device according to a first embodiment of the present invention.

Referring to the drawings, embodiments of the present invention will be described in detail.

First Embodiment

FIG. 1 is a perspective view that shows a camera device according to a first embodiment of the present invention. In FIG. 1, a camera device indicated by reference numeral 1 has a generally-used structure in which a CCD camera or the like is installed and a lens-barrel 3 holding a lens 6 is placed on the front face.

In front of the camera device 1, a display lamp 2 is placed at such a position as to be recognized from the front side, that is, from the light axis direction of the camera device 1. An enclosing member 4, which is one type of a shield unit that limits the visual state of the display lamp 2 from the peripheral area thereof, is provided on the periphery of the display lamp 2. The enclosing member 4 is provided so as to make the angle at which the display lamp 2 is visible in the light axis direction of the camera device 1 coincident with an image capturing range of the camera device 1. This enclosing member 4 is formed into a rectangular shape by using a thin plastic plate, a metal plate or the like, and in this figure, it is attached to the camera device 1 in a manner so as to allow the display lamp 2 to be positioned in the center. For this reason, the enclosing member 4 limits the view so that, although the display lamp 2 can be viewed from the front face direction, it cannot be viewed from the side face directions. The enclosing member 4 forms a border between the visible and invisible ranges with respect to the display lamp 2 at an angle in the middle of the front face and the side face of the camera device 1. This border line between the visible and invisible ranges is aligned with the angle of view of the lens 6, so that it becomes possible to recognize whether or not a subject is located within the angle of view during an image capturing process.

Here, the border line between the visible and invisible ranges of the display lamp 2 is determined by factors of the enclosing member 4, such as the size (length of the circumference), the shape (such as a square shape, a round shape, an elliptical shape, a trapezoidal shape and a triangular shape) and the protruding size of the enclosing member 4 toward the front face direction from the camera device 1.

Figure 3:
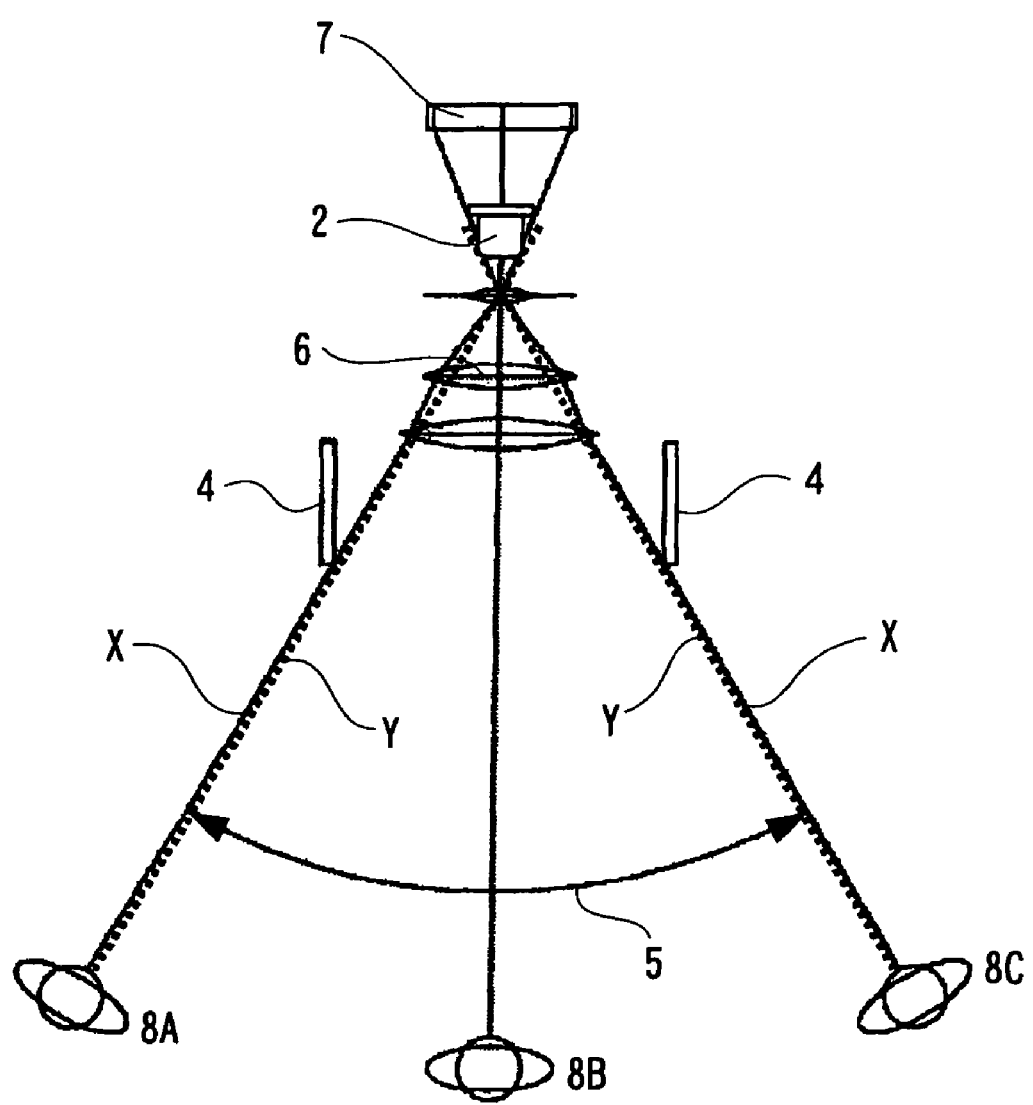
FIG. 3 is an explanatory view that shows a camera angle of view of the camera device according to the first embodiment of the present invention.

FIG. 3 is an explanatory view that shows an image capturing range of the camera device 1 according to the first embodiment. In FIG. 3, the image capturing range (angle of view) 5 indicates an angle of view at which the camera device 1 can capture images. In other words, the image capturing range 5 corresponds to a range enclosed by a solid line X, where images of subjects 8A, 8B and 8C are captured on an image element 7 through the lens 6. When the subjects 8A, 8B and 8C are located within this range, the images of the subjects can be captured by the camera device 1. Moreover, the display lamp 2 and the enclosing member 4 are indicated in physically positional association with the image element 7 including devices such as lens 6 and CCDs, when the camera device 1 is seen on the plan view. The range that allows visual recognition of the display lamp 2 is a range enclosed by a broken line Y.

As shown in FIG. 3, when the shape of the enclosing member 4 is adjusted so as to make the range indicated by the solid line X and the range indicated by the broken line Y substantially coincident with each other, if the subjects 8A, 8B and 8C are located within the image capturing range 5, each of the subjects is allowed to visually recognize the display lamp 2 from the corresponding position, while, if the subjects 8A, 8B and 8C are located out of the image capturing range 5, each of them fails to visually recognize the display lamp 2 from the corresponding position. In FIG. 3, an angle range (range which allows a visual recognition of the display lamp 2), formed by a straight line that connects the subject 8A, the tip inner edge of the enclosing member 6 that is close to the subject 8A and the tip outer edge of display lamp 2 that is far from the subject 8A with one after another and a straight line that connects the subject 8C, the tip inner edge of the enclosing member 6 that is close to the subject 8C and the tip outer edge of the display lamp 2 that is far from the subject 8C with one after another, is made substantially coincident with the image capturing range (angle of view) 5. With this structure, the subjects 8A, 8B and 8C, who are located ahead of the camera device 1, are allowed to recognize to be within the image capturing range 5 when they are staying at positions where the display lamp 2 is visible. In contrast, they recognize that they are out of the image capturing range 5 when they are staying at positions where the display lamp 2 is invisible because it is shield by the enclosing member 4. Here, in FIG. 3, the solid line X and the broken line Y are drawn with a slight gap from each other for convenience of explanation; however, actually, these lines are desirably set in an overlapped manner.

In this embodiment, description has been given by defining the shape of the enclosing member 4 as a rectangular shape; however, not particularly limited to the rectangular shape, the enclosing member 4 may be formed into any shape, such as a square shape, a round shape, an elliptical shape, a trapezoidal shape, a triangular shape and a lozenge shape. A shape with one portion thereof being omitted, such as a C-shape, may also be used.

Second Embodiment

Figure 2:
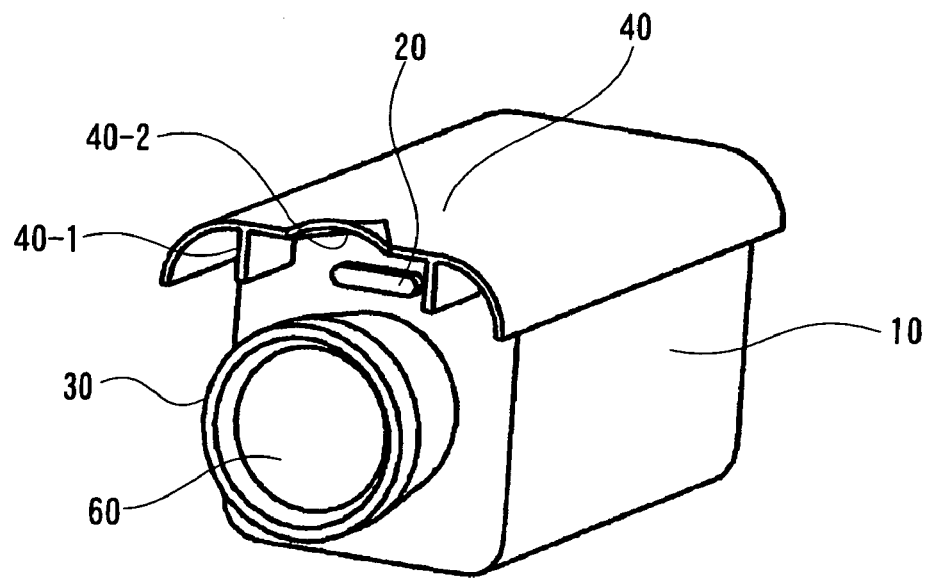
FIG. 2 is a perspective view that shows a camera device according to a second embodiment of the present invention.

FIG. 2 is a perspective view that shows a camera device according to a second embodiment of the present invention. In FIG. 2, a camera device 10 is the same as that of the first embodiment; therefore, the description thereof is omitted.

In front of the camera device 10 according to the second embodiment, a display lamp 20 is placed at a position that is recognized from the front side. The display lamp 20 has a laterally elongated shape. This shape is prepared so as to ensure the visibility of the display lamp 20 in lateral directions.

A cover 40, which is one type of a shield unit, is placed in a manner so as to protect the camera device 10 and the lens-barrel 30 from above, so that sun lights directed diagonally from above are also shielded. This cover 40, which is formed by bending both sides of a rectangular plate downward, is provided with a protruding portion 40-2 in the center of the front edge. This portion is formed by bending the center of the tip of the cover 40 upward into a substantially arc shape so that the display lamp 20 can be viewed even from above within the camera angle of view.

Moreover, ribs 40-1, which extend downward, are formed on both sides in the center of the tip lower face of the cover 40, with the display lamp 20 sandwiched in between. In this manner, the display lamp 20 is covered from both sides thereof to the upper portion thereof with the center portion of the tip of the cover 40 and the ribs 40-1 formed on both sides of the display lamp 20 so that the visible range of the display lamp 20 is limited; thus, the display lamp 20 is designed to be invisible from ranges with predetermined angles or more in lateral directions as well as in the upward direction from the front face.

Figure 4:
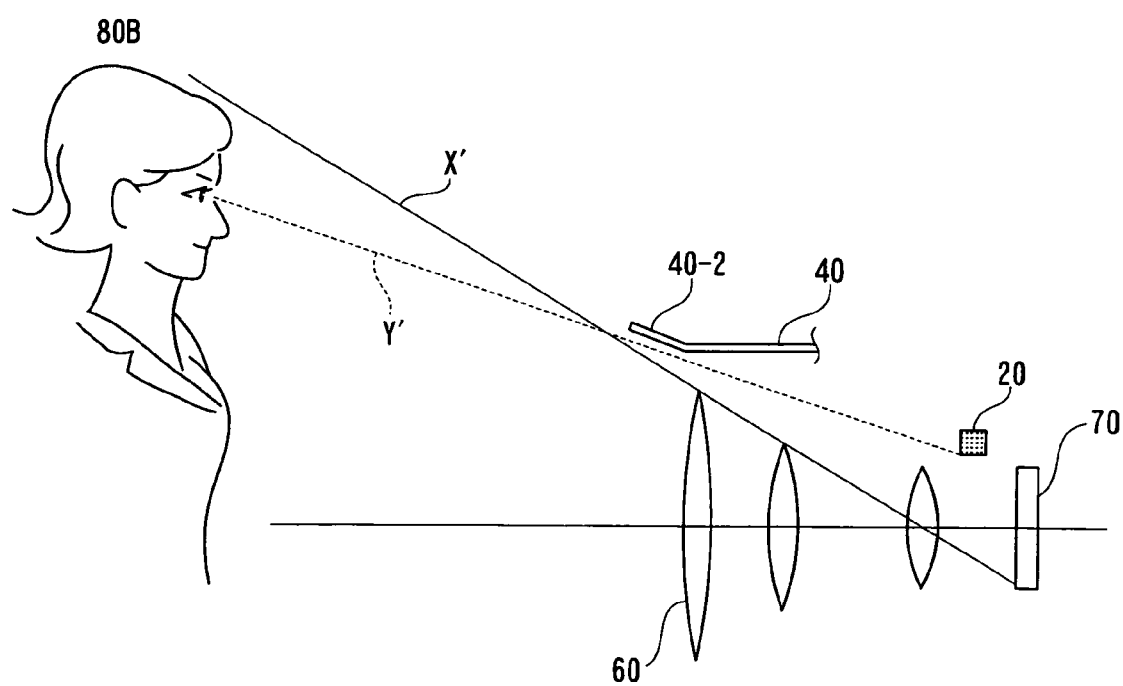
FIG. 4 is an explanatory view that shows a camera angle of view of the camera device according to the second embodiment of the present invention.

FIG. 4 indicates an image capturing range of the camera device 10 from above in the second embodiment. In FIG. 4, the image capturing range that allows the camera device 10 to capture images upward is defined as a range indicated by a solid line X' in which an image of the subject 80B is captured on the image element 70 through the lens 60. When the subject 80B enters within the angle indicated by solid line X', it becomes possible to capture an image of the entire head portion thereof.

When the subject 8B is far from the camera device 1, the line of sight indicated by a broken line Y' and solid line X' indicating the image capturing range are substantially coincident with each other. However, as shown in FIG. 4, when the subject 80B is close to the camera device 1, the line of sight indicated by broken line Y' and solid line X' indicating the image capturing range are not necessarily coincident with each other. The shape of the cover 40 is designed so that, when one portion of the subject 80B, for example, the head portion, is located out of the image capturing range, the display lamp 20 becomes invisible from the corresponding position; thus, the visible range relating to the angle of solid line X' and the angle of broken line Y' is adjusted in the corresponding manner. With this arrangement, at a position of the subject 80B ahead of the camera 10, when the subject 80B is located within the range where the display lamp 20 is visible, the subject is allowed to recognize that the entire head portion is located within the image capturing range. In contrast, when the subject 80B is located at a position where the display lamp 20 is shielded by the cover 40 and invisible, the subject is allowed to recognize to be out of the image capturing range.

Figure 5:
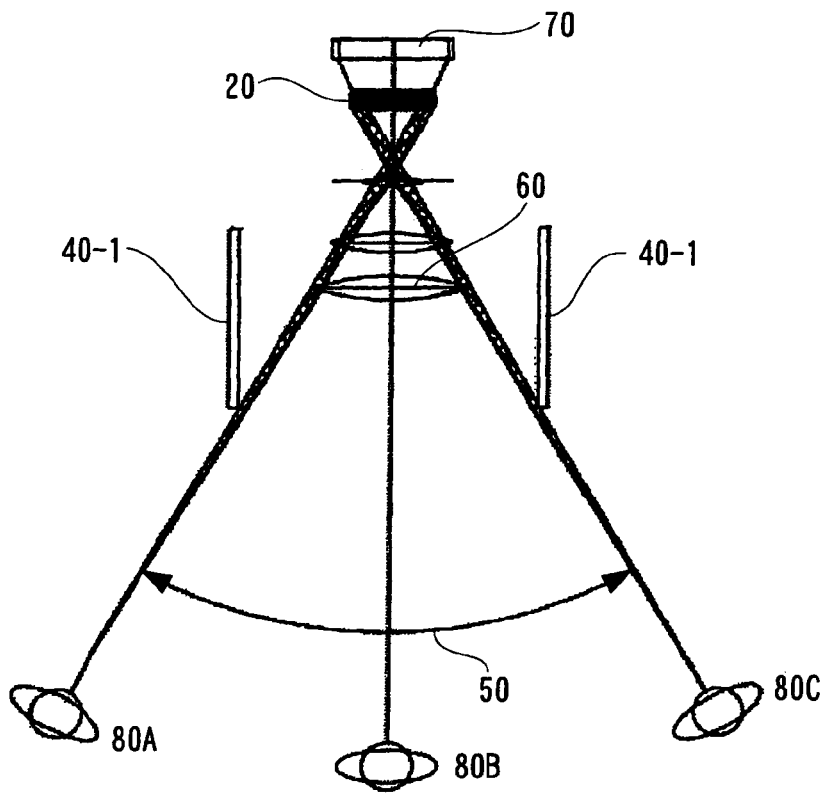
FIG. 5 is an explanatory view that shows a visible range of a display lamp and a camera angle of view of the camera device.

FIG. 5 shows a relationship between the image capturing range 50 in lateral directions and the range where the display lamp 20 is visible in the second embodiment. The range where the display lamp 20 is visible is limited by the rib 40-1, with the result that the display lamp 20 becomes invisible from each of lateral directions with a certain angle or more from the front face. By making this angle that makes the display lamp 20 invisible coincident with the image capturing range 50, when the subjects 80A, 80B and 80C ahead of the camera device 1 are located in a range where the display lamp 20 is visible, the subjects are allowed to recognize to be within the image capturing range 50. In contrast, when the subjects are located in a range where the display lamp 20 is invisible, the subjects are allowed to recognize to be out of the image capturing range 50. Here, one portion of the right side of the display lamp 20 is visible from the subject 80A that is located in an end portion of the image capturing range 50, the entire front face of the display lamp 20 is visible from the subject 80B, and one portion of the left side of the display lamp 20 is visible from the subject 80C. Additionally, the range that allows visual recognition of the display lamp 20 can also be adjusted by adjusting the shape of the display lamp 20.

Figure 6:
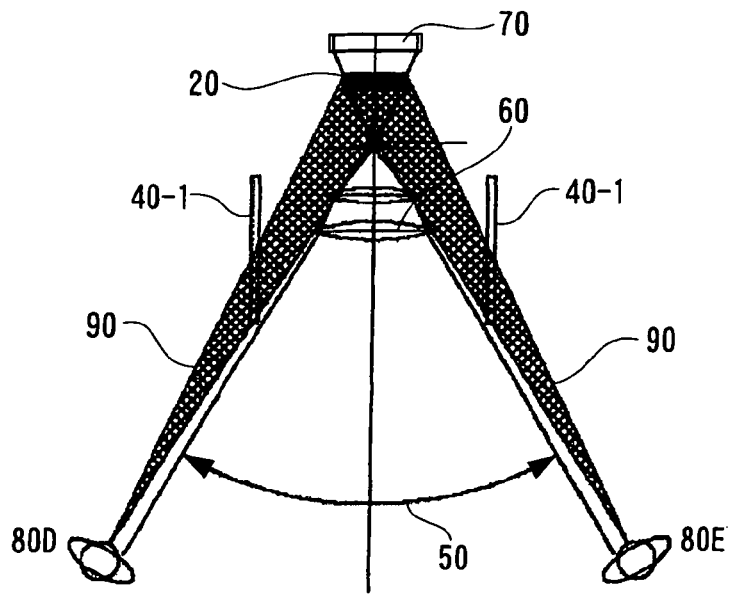
FIG. 6 is an explanatory view that shows a position of a subject deviated from the camera angle of view.

FIG. 6 shows a state in which, when subjects 80D and 80E are located at positions that are deviated from the image capturing range 50, the display lamp becomes invisible in the second embodiment. In order to allow the subjects 80D and 80E to view the display lamp 20, an angle indicated by a visible range 90 of the display lamp 20 is required; however, when the subjects 80D and 80E are standing at positions that deviate from the image capturing range 50, since the visible range 90 is completely shielded by the ribs 40-1, the display lamp 20 becomes invisible. When the subjects 80D and 80E are standing outside of those positions, the display lamp 20 also becomes invisible in the same manner. Therefore, when they are out of the angle of view, the display lamp 20 becomes invisible.

In this embodiment, the ribs 40-1 of the fixed type secured to the tip lower face of the cover 40 have been used; however, ribs 40-1 of a variable type may be used. For example, the ribs 40-1 may be designed to be slidable in front and rear directions of the camera device 1, so that the range where the display lamp 20 is visible can be adjusted. Moreover, the ribs 40-1 may be prepared as other members separated from the cover 40, and a rotation shaft may be attached to the ribs so that the ribs are allowed to rotate centered on this shaft.

Furthermore, a variable plate having a flap shape may be attached to the tip of the cover 40 so as to be variably shifted upward and downward.

The camera device according to the present invention, which is provided with a shield unit, makes it possible to easily recognize an image capturing range from the front side of the camera device, without the necessity of using an image monitor or the like; therefore, the camera device is effectively used, in particular, as a camera device such as a coverage camera and a monitor camera.

What is claimed is:

1. A camera device comprising:
a camera comprising a lens in a front face of the camera;
a display lamp attached to the front face of the camera, viewable from the front of the camera; and
a shield unit at a periphery of the display lamp, said shield extending forwardly and terminating in a frontal edge for limiting a field of view of the display lamp, such that substantially any point at which the lamp is visible is within a field of view of the lens, and substantially any point at which the lamp is not visible is outside a field of view of the lens.

2. The camera device according to claim 1, wherein the shield unit includes an enclosing member that encloses the display lamp.

3. The camera device according to claim 2, wherein a shape of a front edge of the enclosing member is any one of a square shape, a round shape, and elliptical shape, a trapezoidal shape, a triangular shape, a lozenge shape, and a C-shape.

4. The camera device according to claim 2, wherein the viewing field of the display lamp is determined by a circumference and a shape of the enclosing member and a forward extent of the enclosing member from the front face of the camera.

5. The camera device according to claim 1, wherein the shield unit includes at least one rib that shields the display lamp.

6. The camera device according to claim 5, wherein the rib is adjustable.

7. The camera device according to claim 5, wherein the camera further comprises a lens barrel, a cover placed at least above the lens barrel, and at least two ribs extending downward from the cover, and the display lamp is located between the ribs.

8. The camera device according to claim 7, wherein the cover is formed by two sides of a rectangular plate bent downward, and a center of a tip of the cover bent upward into a substantially arc shape.

9. A camera device comprising:
a camera comprising a lens in a front face of the camera;
a display lamp attached to the front face of the camera, viewable from the front of the camera; and
a shield unit at a periphery of the display lamp, said shield extending forwardly and terminating in a frontal edge for limiting a field of view of the display lamp, such that substantially any point along a horizontal plane including the lamp at which the lamp is visible is within a field of view of the lens, and substantially any point along a horizontal plane including the lamp at which the lamp is not visible is outside a field of view of the lens.

10. A device for displaying a viewing angle of a camera lens, comprising:
a camera device comprising a lens;
a display lamp on a front surface of said camera device, such that the lamp is visible from the front of the camera device; and
a shield located on the front surface of the camera device for limiting a viewable area of the display lamp,
wherein the shield forms a border between an area in which the display lamp is visible and an area in which the display lamp is not visible, and
the border between the area in which the lamp is visible and the area in which the lamp is not visible corresponds to a viewing angle of the lens, such that the display lamp is viewable to a person viewing the camera device from the front only when the person is within the viewing angle of the lens.

* * * * *